(12) United States Patent
Ward

(10) Patent No.: US 12,326,605 B2
(45) Date of Patent: Jun. 10, 2025

(54) CARRIAGE FOR PATCHING, SPLITTING, AND/OR GUIDING FIBER OPTIC CABLES

(71) Applicant: OPTERNA AM, INC., Sterling, VA (US)

(72) Inventor: Philip Ward, Bampton (GB)

(73) Assignee: OPTERNA AM, INC., Sterling, VA (US)

( * ) Notice: Subject to any disclaimer, the term of this patent is extended or adjusted under 35 U.S.C. 154(b) by 0 days.

(21) Appl. No.: 17/957,374

(22) Filed: Sep. 30, 2022

(65) Prior Publication Data

US 2023/0021347 A1 Jan. 26, 2023

Related U.S. Application Data

(63) Continuation of application No. 17/093,629, filed on Nov. 9, 2020, now Pat. No. 11,467,359.

(60) Provisional application No. 62/932,456, filed on Nov. 7, 2019.

(51) Int. Cl.
G02B 6/44 (2006.01)

(52) U.S. Cl.
CPC ................ *G02B 6/4453* (2013.01)

(58) Field of Classification Search
CPC .................. G02B 6/4453; H02G 3/045
See application file for complete search history.

(56) References Cited

U.S. PATENT DOCUMENTS

| | | | |
|---|---|---|---|
| 5,497,444 A | 3/1996 | Wheeler | |
| 5,640,476 A * | 6/1997 | Womack | G02B 6/4478 385/86 |
| 5,740,300 A | 4/1998 | Hodge | |
| 6,926,449 B1 * | 8/2005 | Keenum | G02B 6/3897 385/136 |
| 7,346,254 B2 | 3/2008 | Kramer et al. | |
| 9,851,524 B2 | 12/2017 | Vongseng et al. | |
| 10,295,771 B2 * | 5/2019 | Burkett | G02B 6/44528 |

(Continued)

FOREIGN PATENT DOCUMENTS

| | | | | |
|---|---|---|---|---|
| GB | 2481690 A | * | 1/2012 | ............ F16L 3/1226 |
| WO | 2010077856 A1 | | 7/2010 | |
| WO | 2019072783 A1 | | 4/2019 | |

OTHER PUBLICATIONS

Search Report dated Feb. 1, 2021 in corresponding International Application No. PCT/US2020/059756, 5 pages.

(Continued)

*Primary Examiner* — Charlie Y Peng
(74) *Attorney, Agent, or Firm* — MH2 TECHNOLOGY LAW GROUP LLP

(57) ABSTRACT

A carriage is configured to be mounted in a fiber distribution cabinet. The carriage includes a carriage body having a front end, a rear end, a first side, a second side, and a back wall cooperating to define a cavity. A top wall is disposed at the front end of the carriage body, and a plurality of side walls extending from the back wall to the top wall. The top wall, the side walls, and the back wall define a plurality of openings at the front end of the carriage body. The top wall includes a plurality of slots, and each the plurality of slots being associated with a respective one of the plurality of openings. The plurality of openings are sized and configured to receive a fiber optic component.

52 Claims, 16 Drawing Sheets

(56) References Cited

U.S. PATENT DOCUMENTS

| | | |
|---|---|---|
| 2008/0163482 A1* | 7/2008 | Hoshino ............... H01R 9/223 |
| | | 29/868 |
| 2009/0196565 A1 | 8/2009 | Vongseng et al. |
| 2011/0255836 A1 | 10/2011 | Krampotich et al. |
| 2012/0057838 A1 | 3/2012 | Hill et al. |
| 2012/0090170 A1* | 4/2012 | McCaskey ........... H01R 43/015 |
| | | 29/758 |
| 2016/0370552 A1 | 12/2016 | Lambourn et al. |
| 2018/0335595 A1 | 11/2018 | Takeuchi et al. |

OTHER PUBLICATIONS

Written Opinion dated Feb. 1, 2021 in corresponding International Application No. PCT/US2020/059756, 9 pages.

* cited by examiner

CARRIAGE FOR PATCHING, SPLITTING, AND/OR GUIDING FIBER OPTIC CABLES

CROSS-REFERENCE TO RELATED APPLICATION

This application is a continuation of U.S. Nonprovisional application Ser. No. 17/093,629 filed on Nov. 9, 2020, pending, which claims the benefit of U.S. Provisional Application No. 62/932,456, filed Nov. 7, 2019, the disclosures of which are hereby incorporated by reference herein in their entireties.

TECHNICAL FIELD

The present disclosure relates generally to optical communication networks. More particularly, the present disclosure relates to a carriage for patching, splitting, and/or guiding fiber optic cables that can be used with a fiber distribution cabinet.

BACKGROUND

There are many types of FTTx networks. For example, FTTx networks include fiber to the curb (FTTC) networks, fiber to the premises (FTTP) networks, fiber to the business (FTTB) networks, fiber to the home (FTTH) networks, and fiber to the antenna (FTTA) networks. The required cable management components, for example, cable management spools and cable guides, and fiber optic components, for example, adapter plates, splitters, and splice cassettes, depend on the particular FTTx network application. These cable management components and fiber optic components are typically housed within a cabinet or enclosure.

The particular configuration of these cable management components and fiber optic components within the enclosure can vary greatly depending on the required components and the physical location at which the components are being deployed. For example, some applications require preterminated splitter modules, some applications require patch cables, and some applications require a combination of splitter modules and patch cables. However, space in fiber distribution cabinets is restricted. Further, when a conventional module that contains multiple patch cables or multiple splitter modules needs to be replaced, all end users serviced by the conventional module experience a service interruption while the entire module is repaired or replaced.

Accableingly, there is a need for a universal carriage that permits splitting and/or patching of fiber optic cables and provides guides for the fiber optic cables such that the same carriage can be customized and used in a variety of FTTx applications. It may also be desirable to provide a carriage that permits fiber optic cables and/or fiber optic components to be added and/or removed from the carriage without affecting other fiber optic cables and/or fiber optic components that are carried by the carriage. It may also be desirable to provide a carriage that can be mounted in a fiber distribution cabinet in a zero U-space arrangement.

SUMMARY

According to various aspects of the disclosure, a carriage is configured to be mounted in a fiber distribution cabinet. The carriage includes a carriage body having a front end, a rear end, a first side, a second side, and a back wall cooperating to define a cavity. A top wall is disposed at the front end of the carriage body, and a plurality of side walls extending from the back wall to the top wall. The top wall, the side walls, and the back wall define a plurality of openings at the front end of the carriage body. The top wall includes a plurality of slots, and each the plurality of slots being associated with a respective one of the plurality of openings. The plurality of openings are sized and configured to receive a fiber optic component.

In some aspects, the plurality of openings are sized and configured to receive a fiber optic splitter or a fiber optic adapter.

According to various aspects, the carriage is sized to receive an LC duplex adapter or an SC simplex adapter.

According to some aspects, the cavity is configured to receive fiber optic cables and/or fiber optic components.

In various aspects, the carriage includes a plurality of fiber management features extending perpendicular to the plane of the back wall and being disposed in the cavity, and the plurality of fiber management features are configured to route fiber cables to and from the front end of the carriage.

In some aspects, the slots are sized and configured to allow fiber optic cables to be inserted into and/or removed from the opening through the slot, while preventing the fiber optic component from being inserted into and/or removed from the opening through the slot.

According to various aspects, the opening is configured to receive the fiber optic component in a direction from the rear end of the carriage toward the front end of the carriage.

According to some aspects, the opening is configured to receive the fiber optic component in a direction from the front end of the carriage toward the rear end of the carriage.

In various aspects, the carriage includes a second top wall spaced from the front end in a first direction parallel to a plane of the back wall.

In some aspects, the second top wall includes a plurality of tabs spaced from the back wall in a second direction perpendicular to the plane of the back wall.

According to various aspects, the tabs are separated from one another by spaces that are sized and configured to allow fiber optic cables to be inserted into and/or removed from the opening through the slot, while preventing the fiber optic component from being inserted into and/or removed from the opening through the slot.

According to some aspects, the second top wall is configured to cooperate with the side walls to securely retain the optical fiber component that is inserted into the cavity through one of the openings.

The foregoing and other features of construction and operation of the invention will be more readily understood and fully appreciated from the following detailed disclosure, taken in conjunction with accompanying drawings. Throughout the description, like reference numerals will refer to like parts in the various embodiments and drawing figures.

DETAILED DESCRIPTION OF EMBODIMENTS

Figure 1:
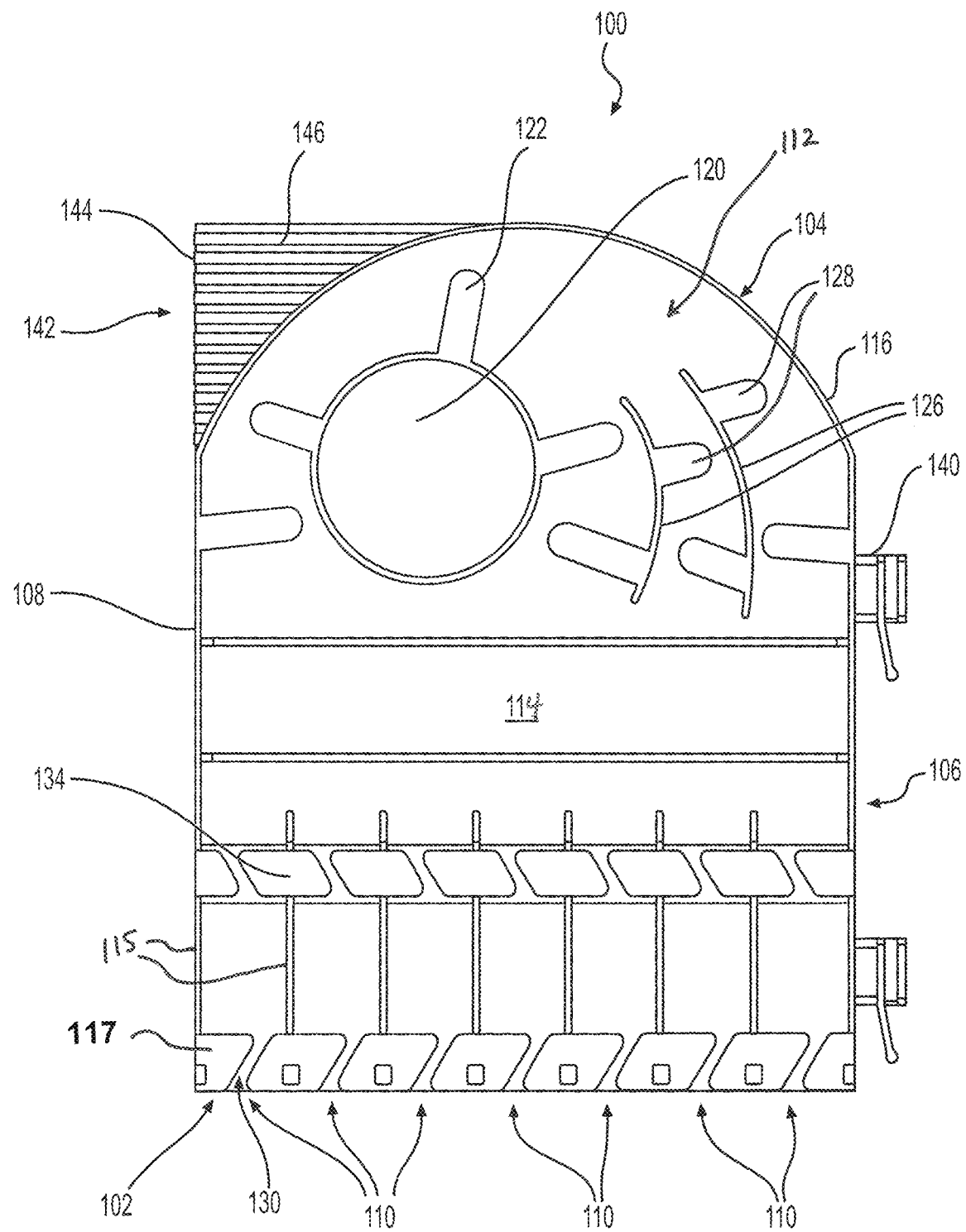
FIG. 1 is a top view of an exemplary carriage in accableance with various aspects of the present disclosure.

Although certain embodiments of the present invention are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

As a preface to the detailed description, it should be noted that, as used in this specification and the appended claims, the singular forms "a," "an," and "the" include plural referents, unless the context clearly dictates otherwise.

Referring to the drawings, FIGS. 1-7 depict an exemplary embodiment of a carriage 100 accableing to various aspects of the disclosure. The carriage 100 is configured to be mounted in any enclosure or cabinet, as will be discussed below.

The carriage 100 includes a carriage body 101 having a front end 102, a rear end 104, a first side 106, and a second side 108. The front end 102 includes a plurality of openings 110. In the exemplary carriage 100 shown in FIGS. 1-7, the front end 102 includes seven openings 110. However, it should be appreciated that the front end 102 could have more than or less than seven openings. In the exemplary carriage 100 shown in FIGS. 1-6, each of the openings 110 is sized and configured to receive an SC (Subscriber Connector) simplex adapter, which is the same size as an LC (Lucent Connector) duplex adapter, for example, via an interference fit, a snap-fit, or the like. Such an opening 110 also permits passage of fiber optic patch cables and/or a fiber cable harness, for example, an IFC (interfacility fiber cable assembly) harness. However, it should be appreciated that the openings 110 could be configured with any desired shape and size and/or one or more of the openings may be shaped and/or sized differently than others of the openings.

The carriage 100 includes an interior cavity 112 in which fiber optic cables and/or fiber optic components are disposed. The cavity 112 is delimited by the front end 102, the rear end 104, the first side 106, the second side 108, and a back wall 114. In some embodiments, a top 116 of the carriage 100 may be open to allow access to the fiber optic cables and/or fiber optic components disposed therein. In some embodiments, the carriage may include a cover (not shown) that is removably attachable to the top 116 of the carriage 100 to allow access to the fiber optic cables and/or fiber optic components disposed therein.

As shown in FIGS. 1-7, the carriage 100 includes a plurality of fiber management features disposed in the cavity 112. For example, the carriage 100 includes a mandrel 120 extending perpendicular from the plane of the back wall 114 into the cavity 112. The mandrel 120 can be a full circle, as shown, or a partial circle configured to guide fiber optic cable along a desired path within the cavity 112. The mandrel 120 may include one or more fingers 122 extending from the mandrel 120 near the top 116 of the carriage 100 in a direction parallel to the plane of the back wall 114. The fingers 122 are configured to retain the fiber optic cables in the cavity 112. The carriage 100 may include one or more additional guides 126 that extend perpendicular from the plane of the back wall 114. The guides 126 may also include one or more fingers 128 extending from the guides 126 near the top 116 of the carriage 100 in a direction parallel to the plane of the back wall 114. The fingers 128 are configured to retain the fiber optic cables in the cavity 112, as will be discussed in more detail below. In one embodiment, there are two guides 126 that fan out the fiber cables for directional distribution. However, more or less guides 126 may be needed based on the bend tolerance specification of the particular fiber cables used.

The mandrel 120, the guides 126, and the fingers 122, 128 are configured to route fiber cables in a safe and organized manner. The mandrel 120 and the guides 126 define a plurality of curved channels for receiving the fiber cables. The curved channels defined by the mandrel 120 and the guides 126 can have specific radii that do not allow the fiber cables to bend more than the specification of the fiber cable allows, thereby minimizing bend loss within fiber cables. Thus, the mandrel 120 and the guides 122 provide a convenient and organized way to route the fiber cables through the carriage 100 and to maintain the fiber cable signal integrity.

Referring again to FIGS. 1-7, each of the openings 110 at the front end 102 of the carriage 100 may be delimited by the back wall 114, a pair of side walls 115, and a top wall 117. In some aspects, the side walls 115 may extend from the back wall 114 to the top wall 117. In other aspects, one or more of the side walls 115 may extend only part of the way from the back wall 114 toward the top wall 117. The top wall 117 may include a plurality of slots 130, with each one of the plurality of slots 130 being associated with a respective one of the openings 110. The slots 130 are sufficiently wide to allow a fiber cable of a patch cable to be inserted into and/or removed from the opening through the slot 130, while being sufficiently narrow to prevent a splitter or an adapter in the opening 110 from being inserted into and/or removed from the opening 110 through the slot 130.

The carriage 100 may include a second top wall 119 including a plurality of tabs 134 that are spaced from the front end 102 in a first direction parallel to the plane of the back wall 114 and spaced from the back wall 114 in a second direction perpendicular to the plane of the back wall 114. The tabs 134 are separated from one another by spaces 136 that are sized and configured to allow a fiber cable of a patch cable to be inserted into and/or removed from the opening through the slot 130, while being sufficiently narrow to prevent a splitter or an adapter in the opening 110 from being inserted into and/or removed from the opening 110 through the slot 130. The tabs 134 are configured to cooperate with the side walls 115 to securely retain an optical fiber component, for example, a splitter, that is inserted into the cavity 112 through one of the openings 110. In some aspects, one or more of the side walls 115 may include an engagement structure (not shown) that is configured to engage an engagement structure on a splitter (see FIG. 13) that is inserted into the cavity 112 through one of the openings 110, as would be understood by persons of ordinary skill in the art.

In some embodiments, the first side 106 may include one or more spring locking clips 140 configured to couple the carriage 100 with a key slot in a wall of a cabinet. The second side 108 may include a gripping structure 142 that facilitates insertion and/or removal of the carriage 100 into/from a cabinet or enclosure. For example, the gripping structure 142 may include a wall 144 that has a thickness that is less than a depth of the carriage 100 such that a user can grip the gripping structure 142 with his/her fingers when a plurality of carriages 100 are arranged in close proximity to one another in the cabinet. In some aspects, the gripping structure 142 may include a surface having a series of ridges 146 or knurls that facilitate gripping by the user.

Figure 2:
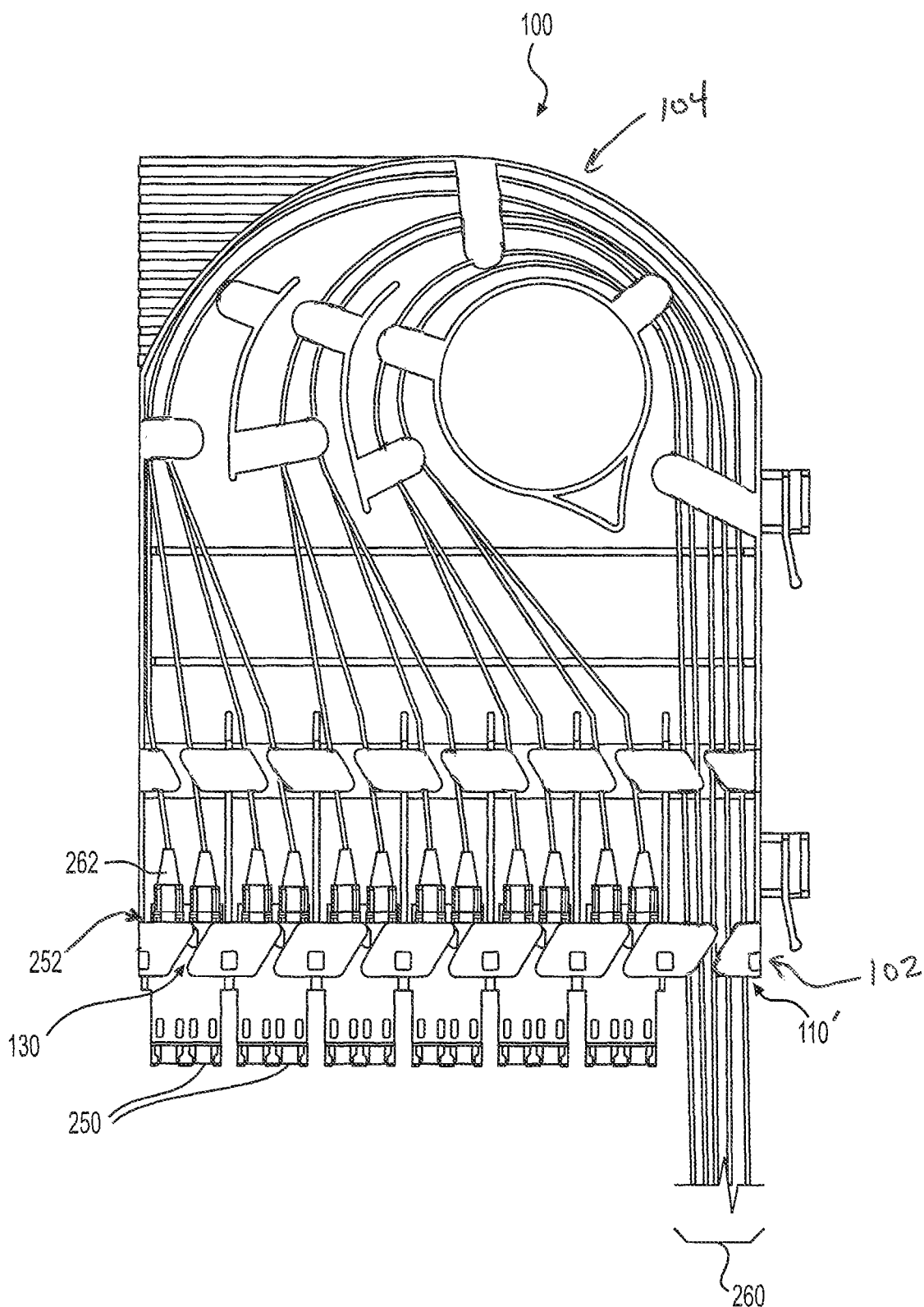
FIG. 2 is a top view of the exemplary carriage of FIG. 1 in a first exemplary use configuration.

Referring now to FIG. 2, a first exemplary use configuration of the carriage 100 is illustrated and described. In the embodiment of FIG. 2, a plurality of fiber optic adapters 250, for example LC duplex adapters, are inserted into the openings 110 at the front end 102 of the carriage 100. FIG. 2 shows six adapters 250 inserted into six of the openings 110. The seventh opening 110' receives twelve fiber patch cables 260 that enter the carriage 100 at the front end 102, are directed toward the rear end 104, and are guided around the mandrel 120. The fiber patch cables 260 are guided by the mandrel 120, the guides 126, and/or one of the walls of the carriage 100 back toward the front end 102 of the carriage 100. Each of the fiber patch cables 260 has a first end terminated with a fiber optic connector 262, for example, an LC connector, which is connected to a rear side 252 of the fiber optic adaptors 250. A second end (not shown) of the each of the fiber patch cables 260 may include a connector (not shown) that is configured to be connected to another fiber optic component, for example, in the cabinet within which the carriage 100 is disposed.

As illustrated, twelve simplex LC cables 260 are connected to six LC duplex adaptors 250. In other embodiments, six duplex cables can be connected to the six LC duplex adapters. It should be appreciated that SC cables and adapters can be used in place of one or more of the LC cables and adapters. In fact, the principle of this embodiment would be possible with any type of adaptor and cable subject to box design, box size, and aperture shape (for the adaptor), such as, for example, MPO connectors.

Because the patch cables 260 and the bulkhead adapters 250 are disposed at the front end 102 of the carriage, there is no need to access the rear of the patch panel/field in order to make rear bulkhead connections. Instead, all connection ports are accessible from one side, i.e., the front end 102, of the carriage 100, which makes it easier for a technician to make moves, additions, and changes.

As will be described in more detail below, the carriage 100 can be used in a data center server cabinet and occupy "zero space" in the rack or chassis that is disposed in the cabinet. The carriage 100 can be used in any FTTX any application requiring patch cable connections from one side. For example, the carriage 100 can be used in wall-mounted cabinets where cables enter and exit from the bottom only, pole mounted applications where cables enter or exit from one side only, and/or street cabinet applications where the patch field needs to be managed in tight space-limited areas or in the upper corner of the cabinet.

Figure 3:
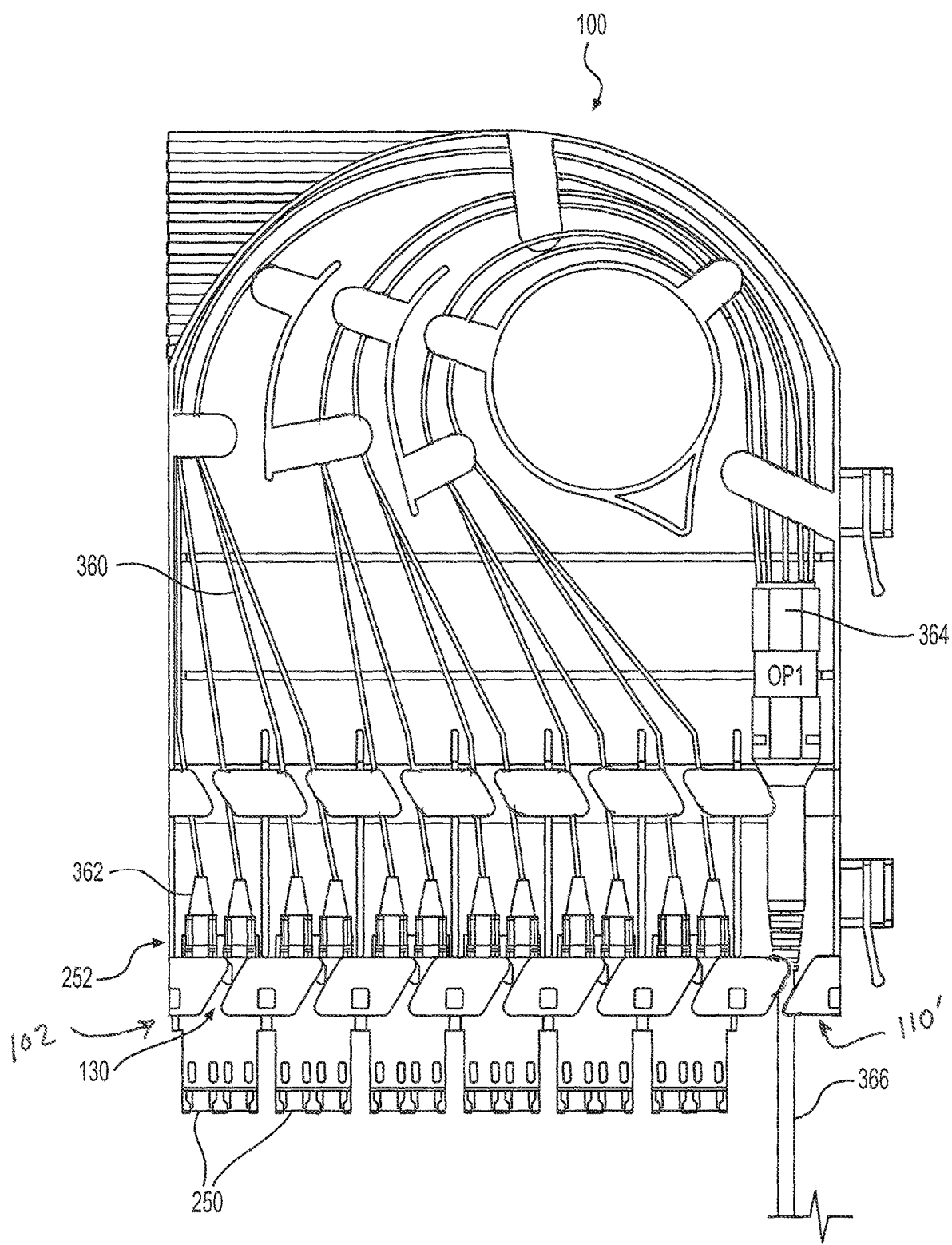
FIG. 3 is a top view of the exemplary carriage of FIG. 1 in a second exemplary use configuration.

Referring now to FIG. 3, a second exemplary use configuration of the carriage 100 is illustrated and described. The configuration of FIG. 3 is only different from that of FIG. 2 in that a multi-fiber harness 364, for example, a twelve fiber harness, which includes twelve LC simplex cables 360, is inserted into the seventh opening 110'. The harness 364 may facilitate quicker installation by a technician than the twelve separate patch cables of the configuration of FIG. 2. The fiber cables 360 are guided by the mandrel 120, the guides 126, and/or one of the walls of the carriage 100 back toward the front end 102 of the carriage 100. Each of the fiber cables 360 has a first end terminated with a fiber optic connector 362, for example, an LC connector, which is connected to a rear side 252 of the bulkhead adaptors 250. The harness 364 may include a multi-fiber cable 366 that extends out through the seventh opening 110' and is configured to be connected to another fiber optic component, for example, in the cabinet within which the carriage 100 is disposed.

As illustrated, twelve simplex LC cables are connected to six LC duplex adaptors. In other embodiments, the harness 364 may include six uniboot LC cores configured to be connected to the six LC duplex adapters. It should be appreciated that SC cables and adapters can be used in place of one or more of the LC cables and adapters. In fact, the principle of this embodiment would be possible with any type of adaptor and cable subject to box design, box size, and aperture shape (for the adaptor).

Figure 4:
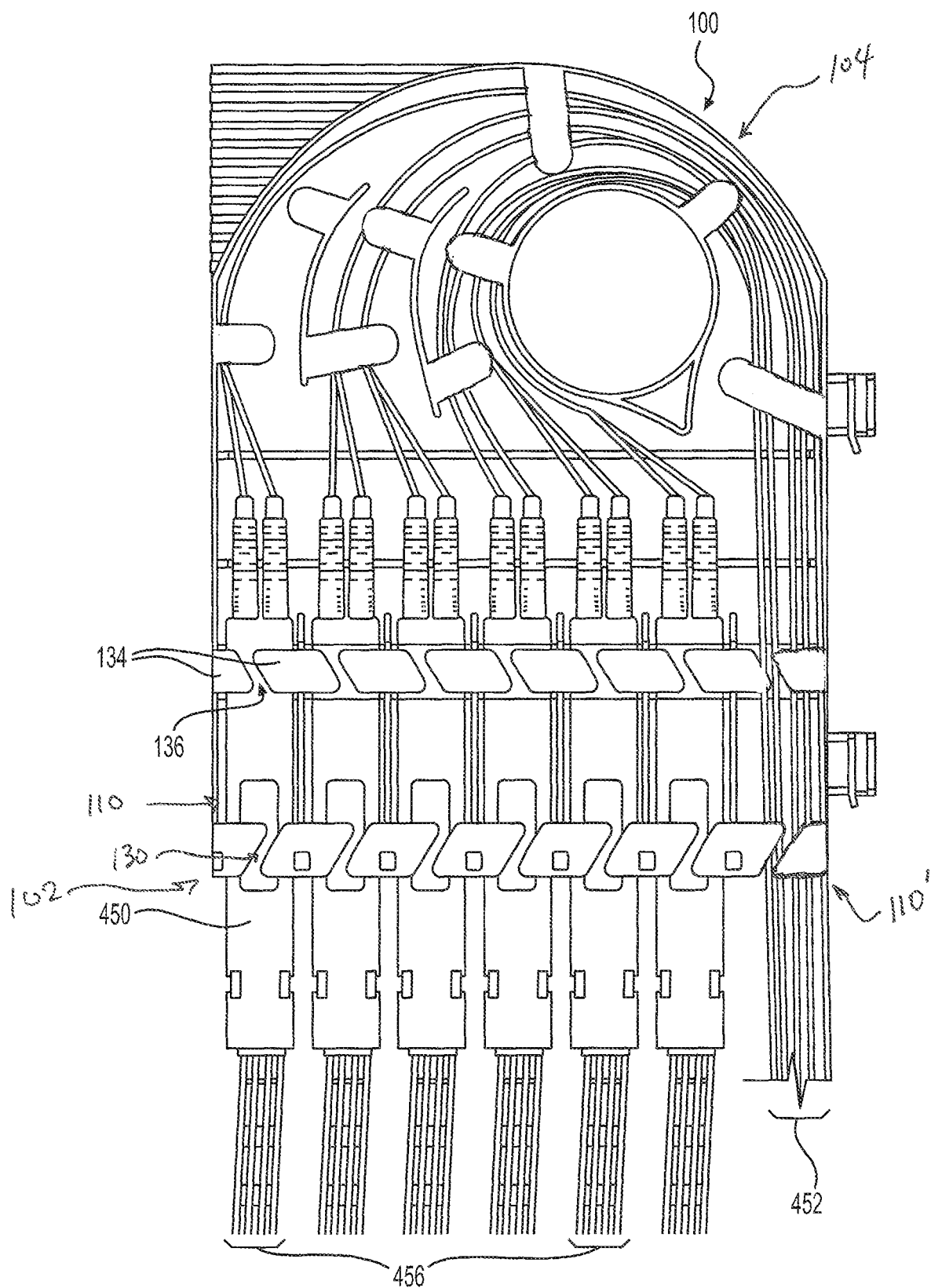
FIG. 4 is a top view of the exemplary carriage of FIG. 1 in third exemplary use configuration.
Figure 5:
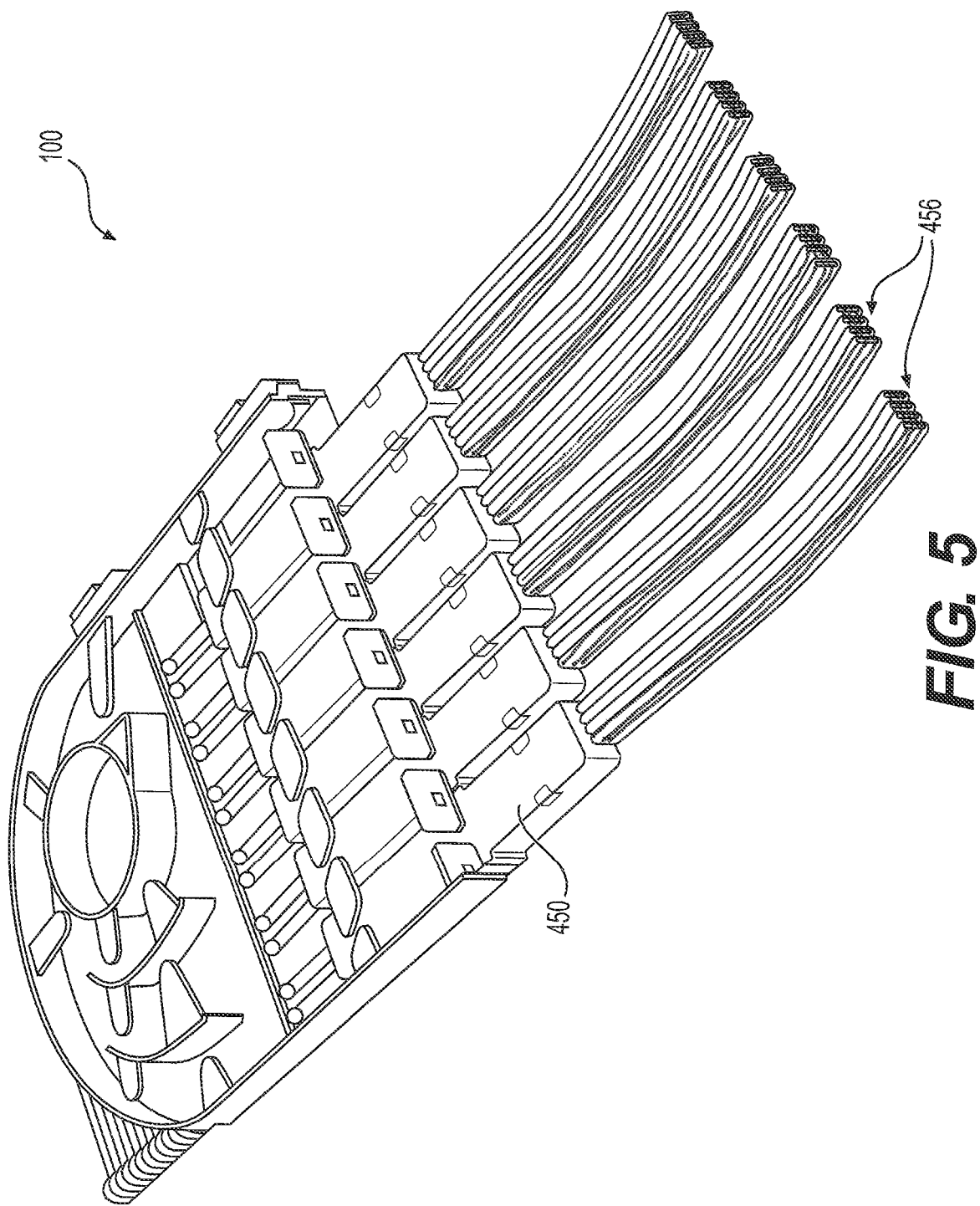
FIG. 5 is a perspective view of the exemplary carriage of FIG. 4.

Referring now to FIGS. 4 and 5, a third exemplary use configuration of the carriage 100 is illustrated and described. In the configuration of FIGS. 4 and 5, preconnectorized splitter modules 450 are inserted into the openings 110 at the front end 102 of the carriage 100. FIG. 4 shows six fiber optic splitter modules 450 inserted into six of the openings 110. The splitter modules 450 include input fiber cables 452 that are guided by the mandrel 120, the guides 126, and/or one of the walls of the carriage 100 back toward the back end 104 of the carriage 100 and around the mandrel 120 toward the front end 102 of the carriage 100 where they can exit the carriage 100 via the seventh opening 110'. The input fiber cables 452 may each include a boot 453 configured to provide strain relief to the cables 452 at an interface with the splitter module 450.

The input cables 452 each include an end, distal from the splitter module 450, having a fiber optic connector (not shown) that is configured to be connected to another fiber optic component, for example, in the cabinet within which the carriage 100 is disposed. The preconnectorized splitter modules 450 includes output fiber cables 456 that have an end (not shown), distal from the splitter module 450, having a fiber optic connector (not shown) that is configured to be connected to another fiber optic component, for example, in the cabinet within which the carriage 100 is disposed.

The slots 130 at the front end of the carriage 100 and spaces 136 between tabs 134 permit the input cables 452 of the splitter modules 450 to be inserted into the cavity 112 to be guided by the mandrel 120 and the guides 126. For example, the output fiber cables 456 of one of the splitters 450 can be inserted through the openings 130 and spaces 136 with the splitter module 450 toward the rear end 104 of the carriage 100. After the output fiber cables 456 are in the opening 110, the splitter 450 can be moved toward the front end 102 and into the opening 110. As mentioned above, the side walls 115 may be configured to securely retain the splitter modules 450 in the carriage 100.

According to this configuration, splitter modules 450 can be added and/removed one at a time. Thus, in the case of a problem with an end user associated with one of the output cables 456, only one of the splitter bodies 454 would need to be removed and/or replaced, and thus only a fraction of the end users serviced by the carriage 100 would be affected during the removal and/or replacement.

Figure 13:
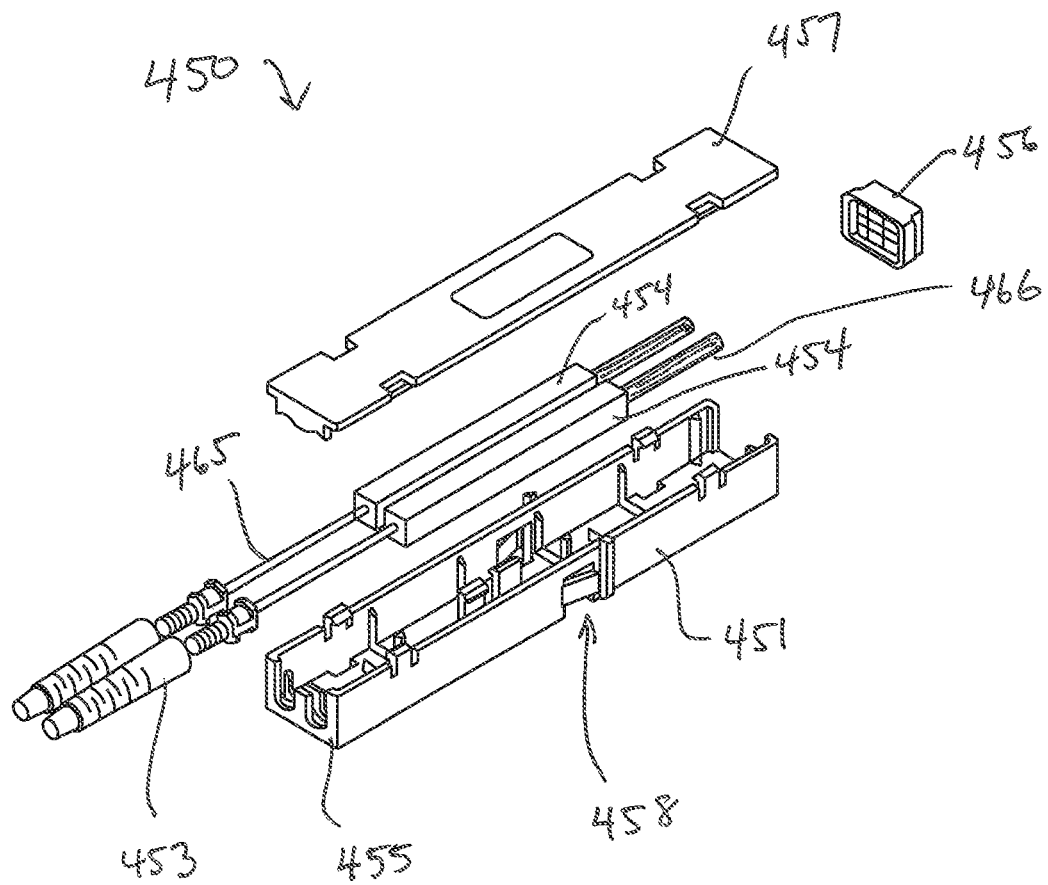
FIG. 13 is a perspective view of an exemplary splitter in accordance with various aspects of the disclosure.

Referring to FIG. 13, the splitter modules 450 include a splitter body 451, one or more splitters 454, a forward wall 455, a rear wall 456, and a cover 457. The splitter body 451 may include an engagement feature 458 configured to be coupled with an engagement feature of at least one of the side walls 115 of the openings 110. For example, the engagement feature 458 may comprise a flexible finger and a projection. The flexible finger is configured to be urged inward when the splitter module 450 is inserted into the opening, and the projection serves as a stop to limit insertion of the module 450 into the opening. In some aspect, the engagement feature of the side wall 115 may be configured to be received between the finger and the projection, and the side wall 115 may be configured to allow the finger to flex back outward to retain the engagement feature of the side wall between the finger and the projection.

The forward wall 455 may include one or more ports configured to receive a fiber input cable 465, and the rear wall 456 may be removable from the splitter body 451. The rear wall 456 may include a plurality of openings each configured to receive an output fiber cable 466. The fiber input cables 465 and fiber output cables 466 may be furcation cables (or furcation tubes) configured to receive an optical fiber, and the optical fibers are spliced to the splitter 454.

As illustrated in FIG. 13, in some aspects, each splitter module 450 may include two splitters 454, and each splitter may be configured as a 1:8 splitter having one input fiber 465 and eight output fibers 466. Of course, in some aspects, the splitter module 450 may include one splitter configured as a 1:16 splitter. It should be appreciated that the splitter modules 450 may contain any other conceivable arrangement of one or more splitters, and the splitters may have higher or lower splitter ratios than 1:8 and 1:16.

Figure 14:
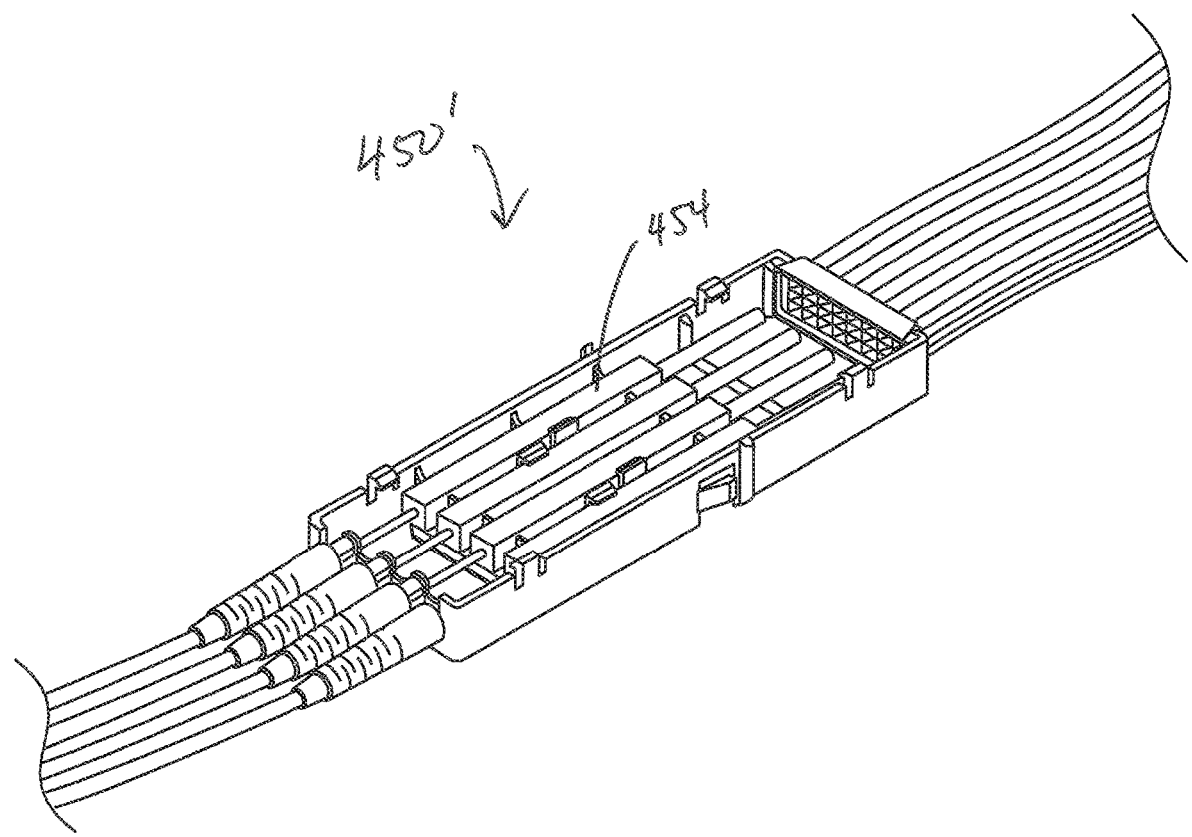
FIG. 14 is a perspective view of another exemplary splitter in accordance with various aspects of the disclosure.

Referring to FIG. 14, for a carriage 100 having one or more larger openings 110, a larger splitter module 450' may be inserted into the larger opening. In some aspects, each splitter module 450' may include four splitters 454, and each splitter may be configured as a 1:8 splitter having one input fiber and eight output fibers. Of course, in some aspects, the splitter module 450 may include one splitter configured as a 1:32 splitter, two splitters configured as 1:16 splitters, etc. It should be appreciated that the splitter modules 450' may contain any other conceivable arrangement of one or more splitters, and the splitters may have higher or lower splitter ratios.

Figure 15:
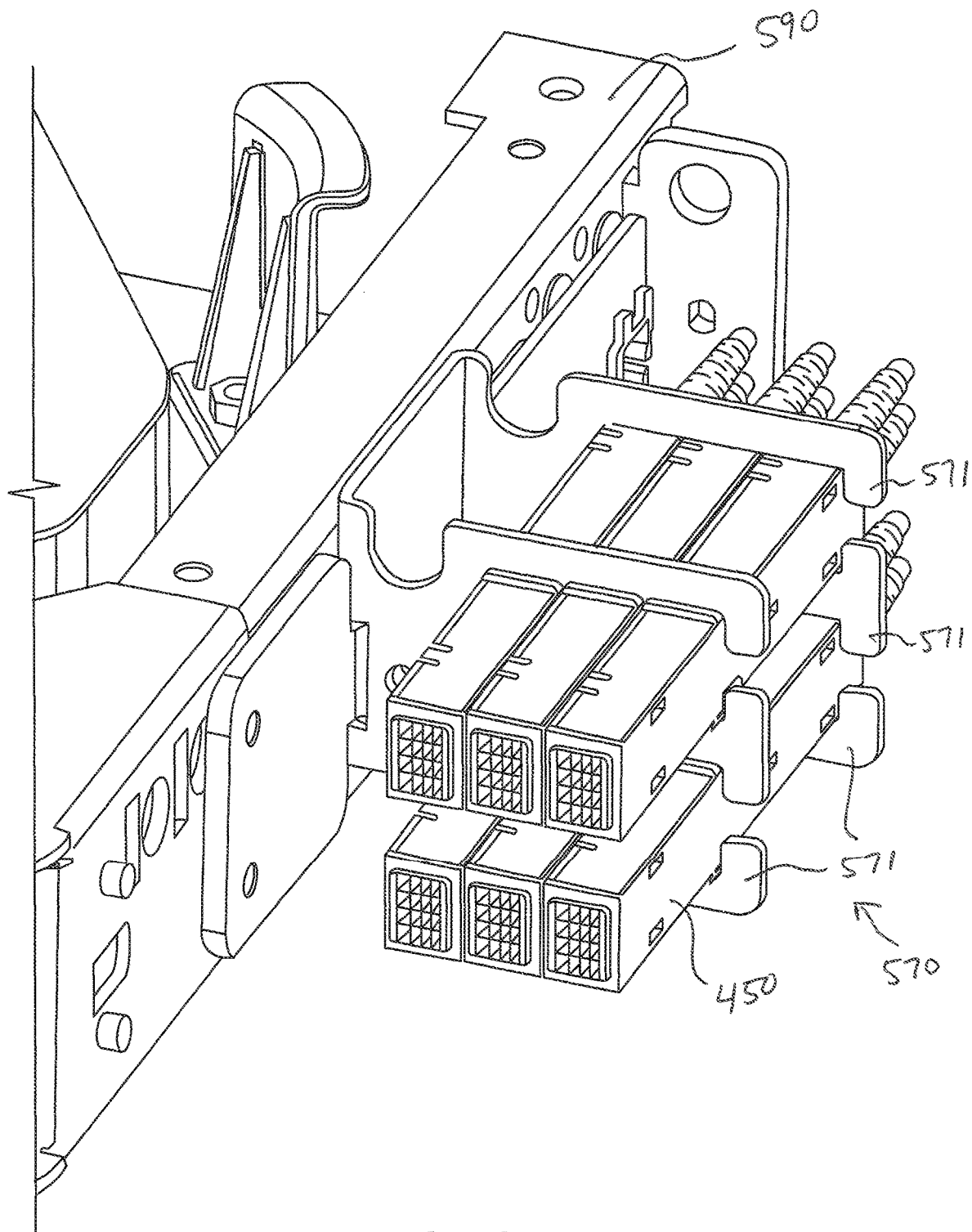
FIG. 15 is a perspective view of the exemplary splitter mounted to a fiber distribution panel in accordance with various aspects of the disclosure

As shown in FIG. 15, one or more of the aforementioned splitter modules 450, 450' may be coupled with a panel 590 of a fiber distribution hub independent of the carriage 100. For example, a splitter holder 570 may be configured to be coupled to the panel, for example, via fasteners or the like. The splitter holder 570 may include arms 571 configured to receive and hold the splitter modules 450, 450'.

Figure 16:
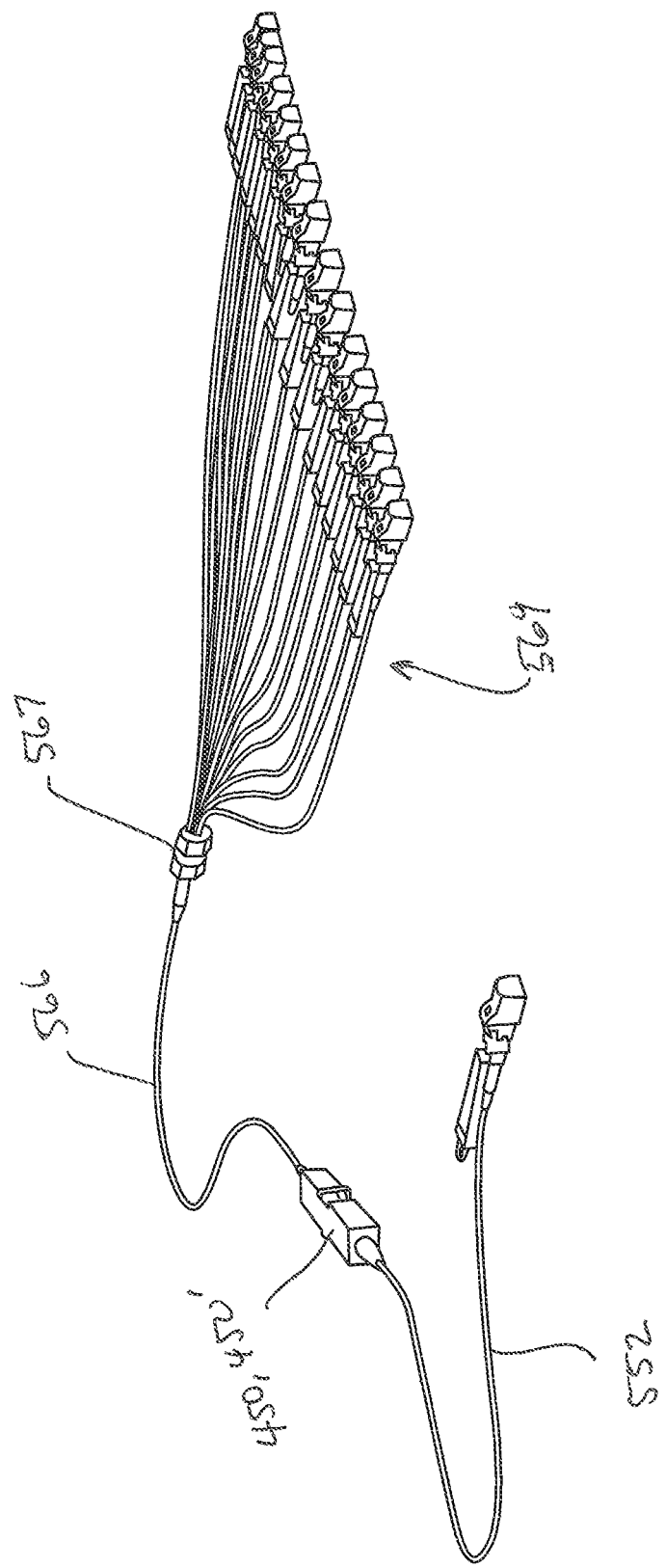
FIG. 16 is a perspective view of the exemplary splitter in a standalone configuration in accordance with various aspects of the disclosure.

In another embodiment, as illustrated in FIG. 16, the aforementioned splitter modules 450, 450' may configured to be used in a manner unattached from the carriage 100 and the panel. As shown in FIG. 16, the splitter module 450, 450' may include a preconnectorized input fiber cable 552 and a multi-fiber output cable 566 having a breakout 567 that breaks out the fibers of the output fiber cable 566 to a plurality of preconnectorized output fiber cables 569.

Figure 6:
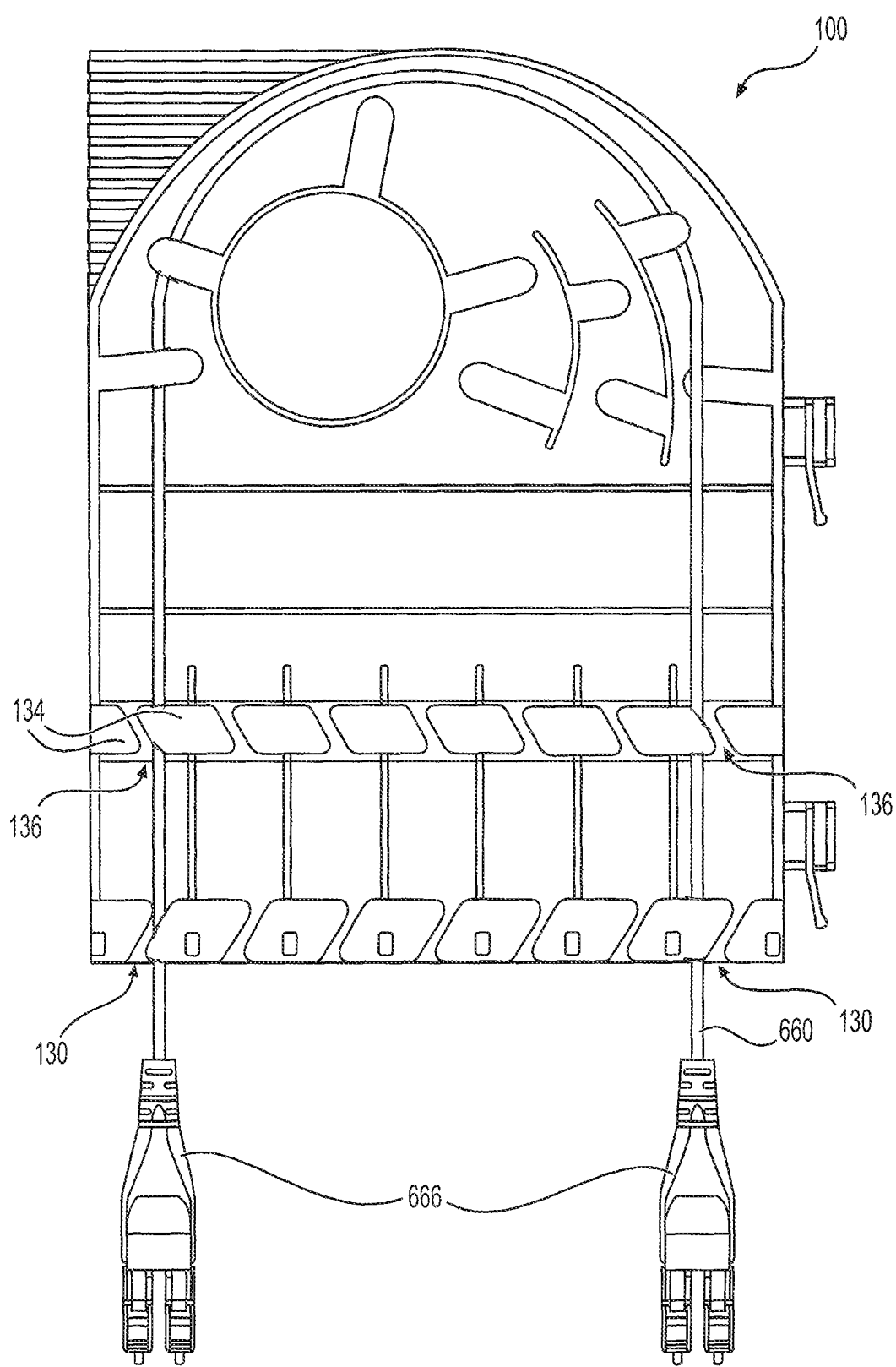
FIG. 6 is a top view of the exemplary carriage of FIG. 1 in a fourth exemplary use configuration.

Referring now to FIG. 6, a fourth exemplary use configuration of the carriage 100 is illustrated and described. In the configuration of FIG. 6, a patch cable 660 is inserted into the openings 110 at the front end 102 of the carriage 100. FIG. 2 shows only one patch cable inserted into one of the openings 110. However, it should be appreciated than any number of patch cables 660 can be inserted into the openings 110 and the cavity 112, limited only by the size of the openings 110 and the carriage 100. The patch cable 660 is guided by the mandrel 120, at least one of the guides 126, and/or one of the walls of the carriage 100 back toward the back end 104 of the carriage 100 and around the mandrel 120 toward the front end 102 of the carriage 100 where they can exit the carriage 100 via another one of the openings 110. The slots 130 at the front end of the carriage 100 and spaces 136 between tabs 134 permit the patch cable 660 to be inserted into the openings 110 and into the cavity 112 to be guided by the mandrel 120 and the guides 126.

In the embodiment of FIG. 6, there is no connectivity inside the carriage 100, but instead the carriage 100 is only used as a method of hanging patch cables 660. The patch cables 660 can be hung in the same way that the splitter is so that the cable management is much easier inside of the cabinet. No complex cable management is required inside cabinet for an installer to follow. This arrangement is useful for any application requiring a patch cable to be hung inside a cabinet so that the two individual connectorized ends 666 can be connected to two different ports.

Figure 7:
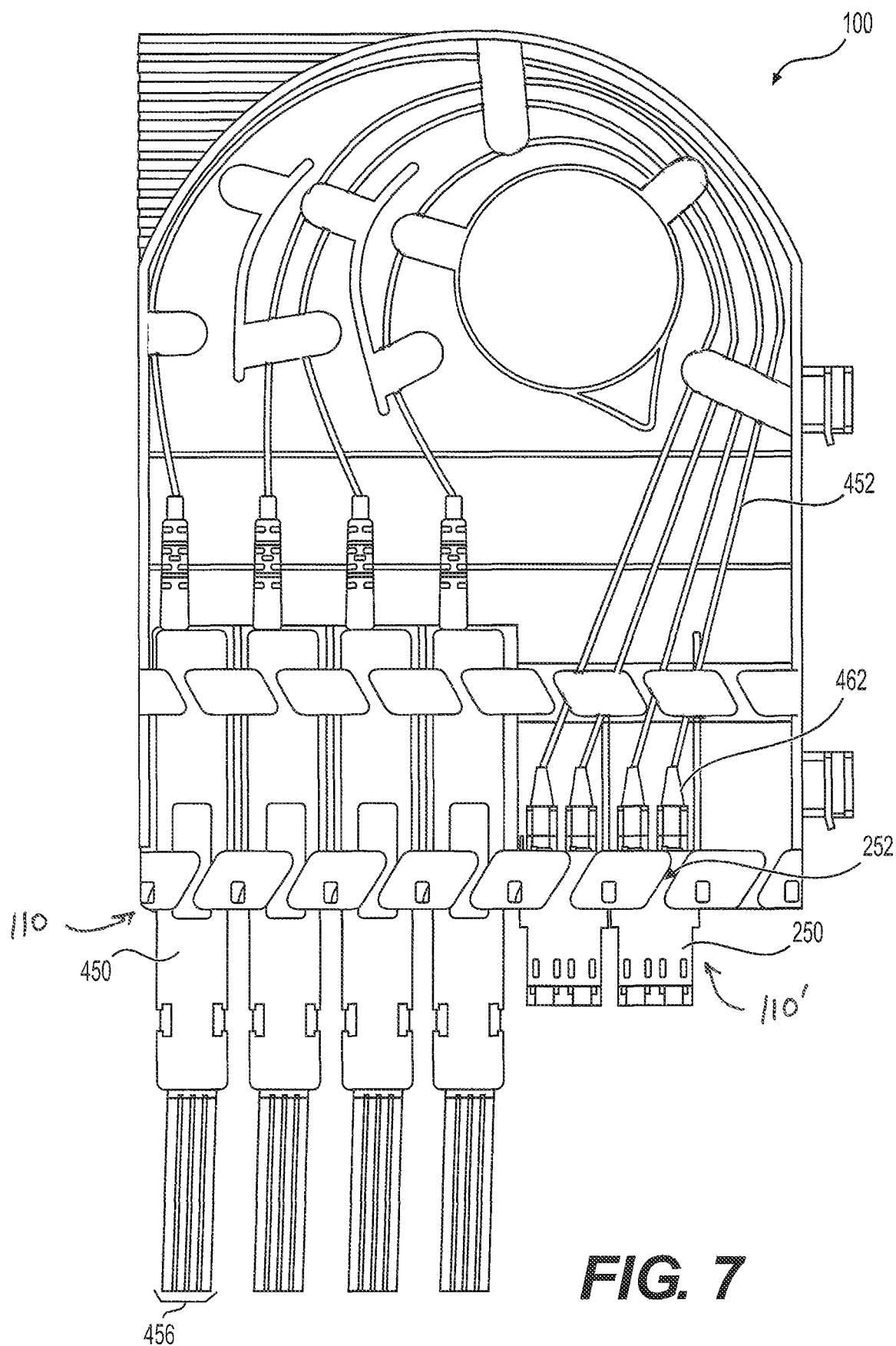
FIG. 7 is a top view of the exemplary carriage of FIG. 1 in a fifth exemplary use configuration.

Referring now to FIG. 7, a fifth exemplary use configuration of the carriage 100 is illustrated and described. In the configuration of FIG. 7, preconnectorized splitter modules 450 are inserted into some of the openings 110 at the front end 102 of the carriage 100. FIG. 7 shows four fiber optic splitter modules 450 inserted into four of the openings 110. The splitter modules 450 include input fiber cables 452 that are guided by the mandrel 120, the guides 126, and/or one of the walls of the carriage 100 back toward the back end 104 of the carriage 100 and around the mandrel 120 toward the front end 102 of the carriage 100 where they have ends that are terminated with a connector 462, for example, an LC connector, which is connected to a rear side 252 of fiber optic adaptors 250, which are received by openings 110' at the first end 102 of the carriage 100. FIG. 7 shows two bulkhead adapters 250, for example, LC duplex adapters, inserted into two of the openings 110'.

Figure 8:
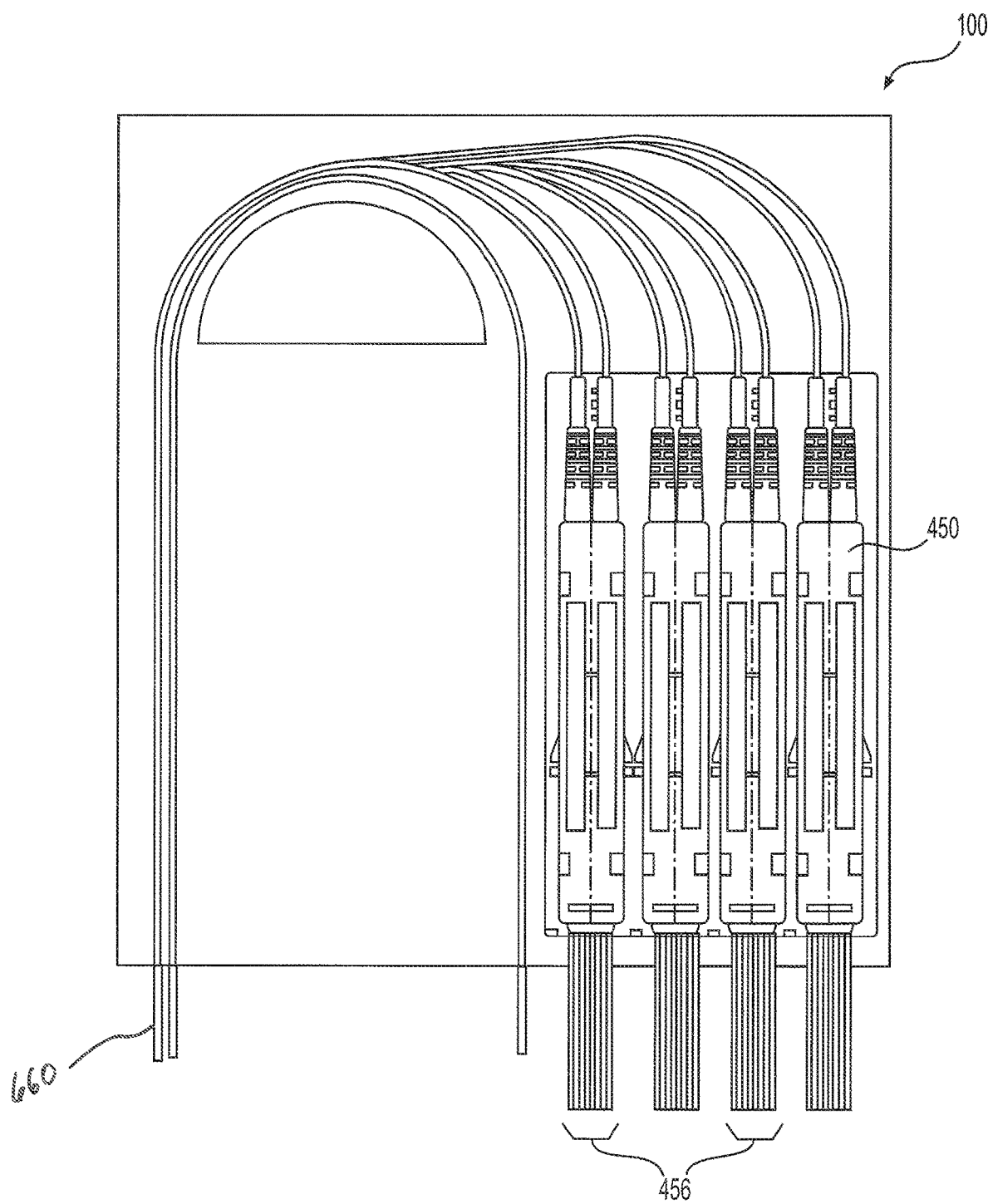
FIG. 8 is a top view of the exemplary carriage of FIG. 1 in a sixth exemplary use configuration.

It should be appreciated that the universal nature of the carriage 100 permits the carriage 100 to include any combination of adapters 250, patch cables 260, harnesses 364, splitter modules 450, and/or patch cables 660 desired by a customer. For example, as shown in FIG. 8, the carriage 100 may include four splitter modules 450 and one patch cable 660. The number and size of these elements are only limited by the size and configuration of the carriage 100.

Figure 9:
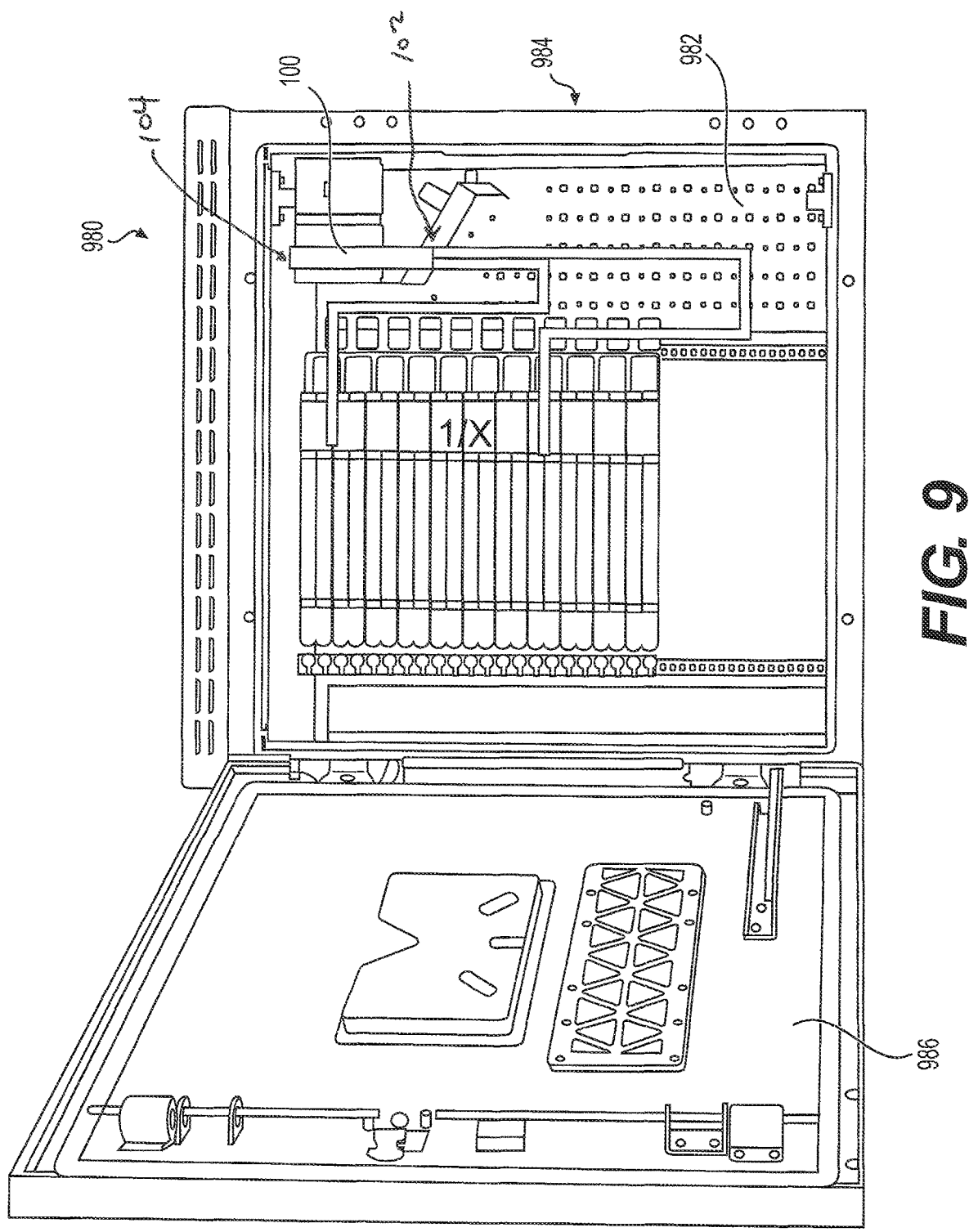
FIG. 9 illustrates an exemplary fiber distribution cabinet containing the exemplary carriage of FIG. 1.

Referring now to FIGS. 9-12, arrangement of the carriage 100 in a fiber distribution cabinet 980 is illustrated and described. FIG. 9 illustrates a typical fiber distribution cabinet 980, and the carriage 100 is mounted in the cabinet 980 in a vertical orientation. That is, the carriage 100 is mounted with the front end 102 facing downward, the rear end 104 facing upward, the first side 106 facing a rear wall 982 of the cabinet 980, and the second side 108 facing a front 984 of the cabinet, which may be closed by a door 986. As shown, the carriage 100 is used for a point-to-point (P2P) patch cable connection, similar to that shown in FIG. 6. That is, one end of the patch cable 660 is connected to a Feeder Optical Distribution Frame (ODF), i.e., where the signal is coming from the Head-end/Central Office, and the other end is connected to a Distribution ODF, which is where the signal is being sent to end users.

Figure 10:
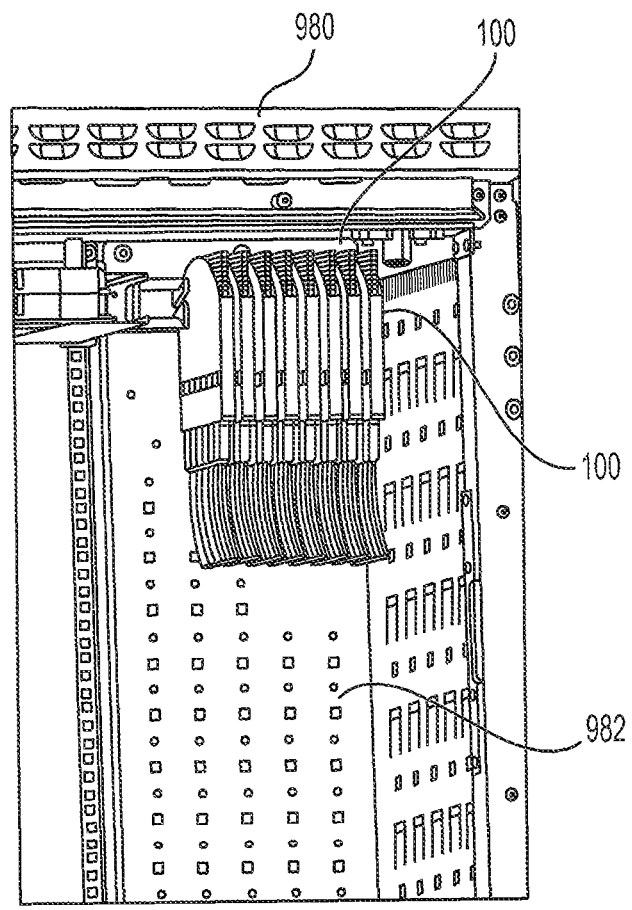
FIG. 10 illustrates a plurality of the exemplary carriages of FIG. 1 mounted to a rear wall of a fiber distribution cabinet in a zero U-space arrangement.

FIG. 10 illustrates a plurality of the carriages 100 mounted in the upper right hand corner of a fiber cabinet in the vertical orientation and in a zero U-space of the cabinet. For example, the one or more spring locking clips 140 may be coupled with key slot(s) on the back wall 982 of the cabinet 980. The carriages 100 may be configured according to one of the aforementioned exemplary configurations or with any other desired configuration. FIG. 10 illustrates eight carriages 100. If the carriages 100 are configured as shown in FIG. 4, which includes six splitter modules 450, the eight carriages 100 would include a total of 48 splitter modules 450. Each splitter module 450 may include two splitters 454, each of which includes a 1:8 splitter, a 1:16 splitter, etc., as described above.

Figure 11A:
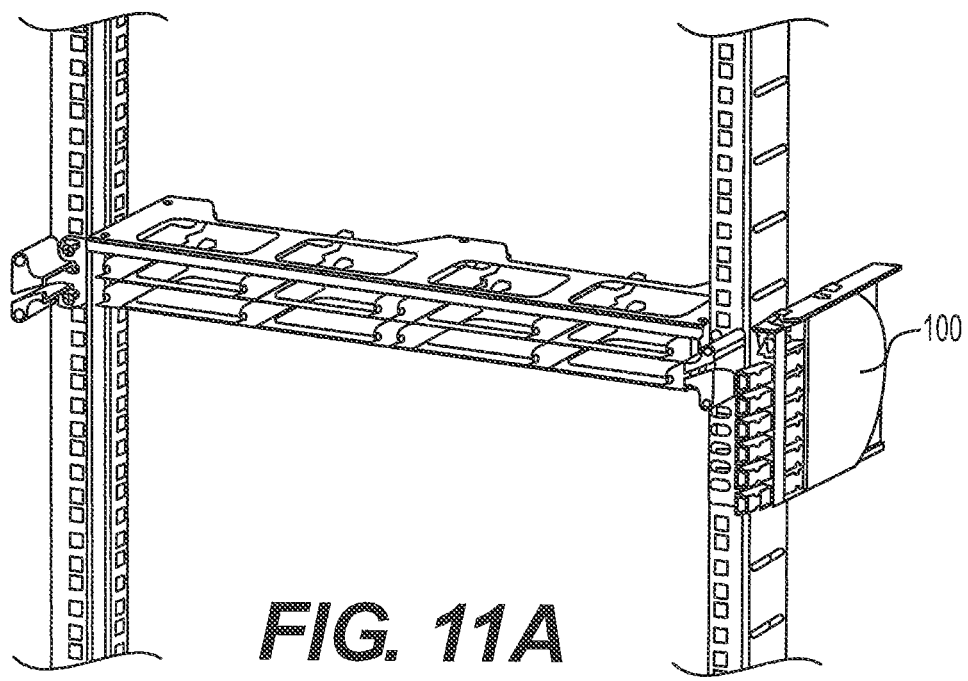
FIGS. 11A and 11B illustrate the exemplary carriage of FIG. 1 mounted to a rack chassis of a fiber distribution cabinet in a zero U-space arrangement.
Figure 11B:
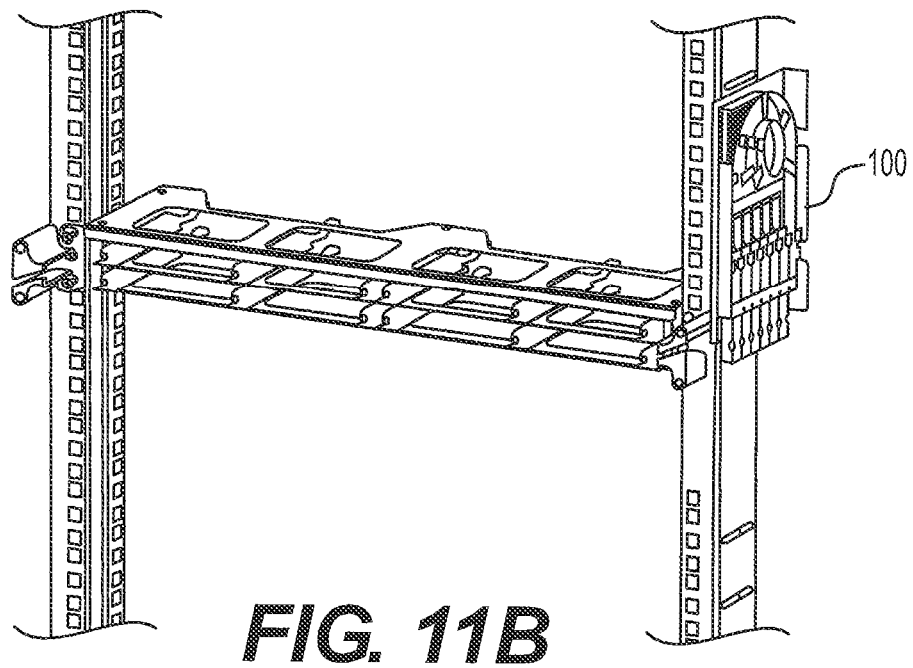
Figure 12:
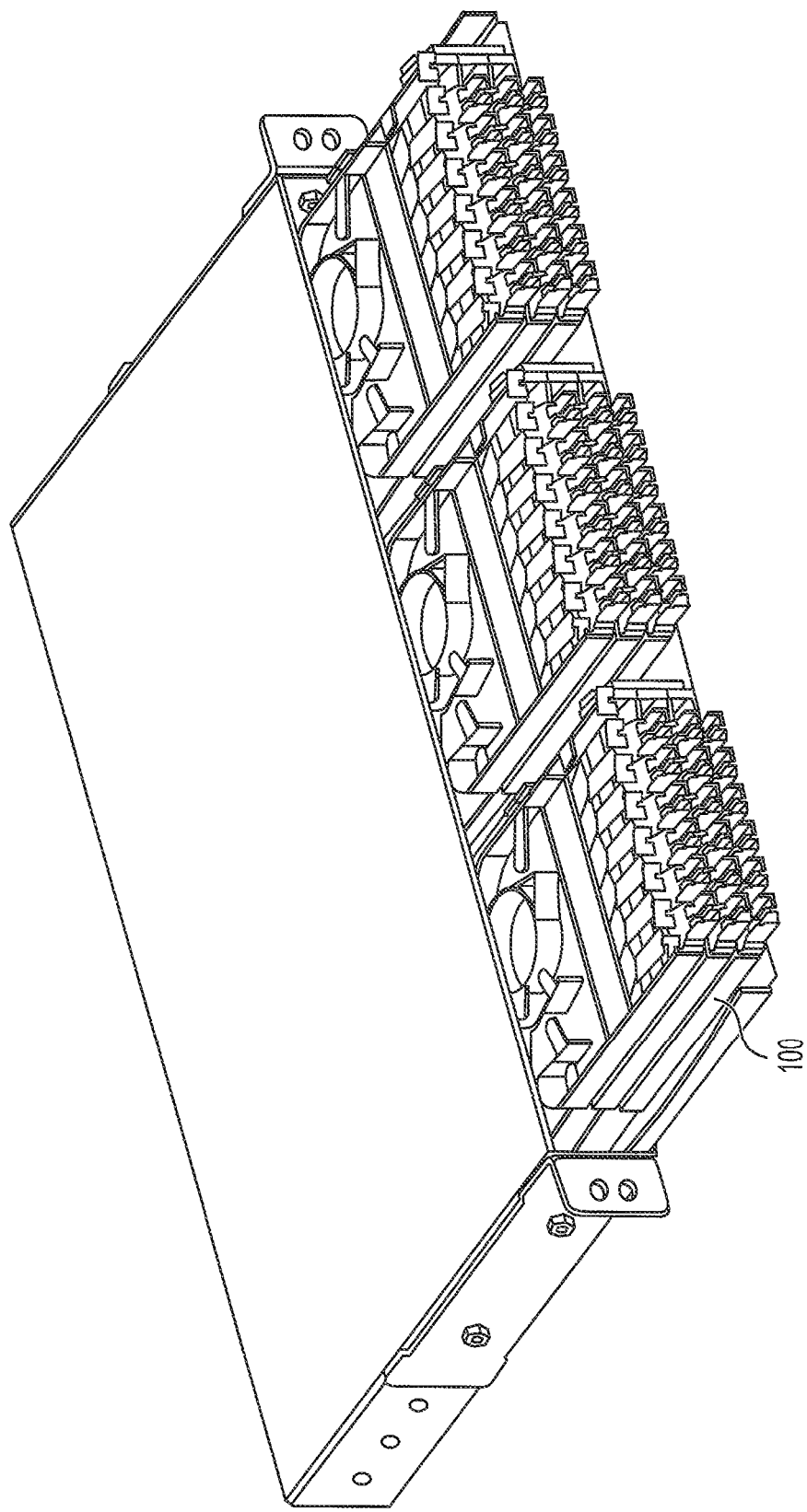
FIG. 12 illustrates a plurality of the exemplary carriages of FIG. 1 mounted to a rack chassis of a fiber distribution cabinet.

FIGS. 11A and 11B illustrate another zero U-space mounting position of the carriage 100 in a cabinet. Zero U-space is a term used when patch panels are fixed somewhere other than between the intended fixing rails of a rack chassis. In this respect, the patch panel occupies no valuable space inside the rack chassis and, thus, the space in the rack chassis can be used for revenue generating servers or switches. Therefore, the carriage can be used for fitting inside standard cabinets that have not been adapted to accept this box, i.e. does not have key slots configured to receive the locking clips 140. For example, in this arrangement, a folded metal plate could be fixed to the standard fixing rail of the rack chassis (behind equipment fixings) and then has a shape which will allow the box to be fixed to the plate. Slots in the rear plate of the bracket would facilitate this arrangement. Referring now to FIG. 12, it should be appreciated that the carriage 100 can also be mounted to a 19", 21", or 23" panel, either vertically or horizontally stacked.

It should be appreciated that, in some aspects, the carriage 100 may be preconnected to and packaged with a fiber optic panel for delivery to an end user. For example, the carriage 100 may be populated with one or more preconfigured splitter modules 450, 450' prior to being provided to an end user. Each splitter module 450 may include one or more fiber input cables and a plurality of fiber output cables based on the one or more splitters contained in the splitter module. Each of the fiber output cables may be pre-connectorized and inserted into a port of the fiber optic panel, and each of the fiber input cables may be pre-connectorized so that upon delivery to an end user location, only the fiber input cables need to be coupled with an adapter port in order to provide input signals to the splitter modules 450, 450'.

Additional embodiments include any one of the embodiments described above, where one or more of its components, functionalities or structures is interchanged with, replaced by or augmented by one or more of the components, functionalities, or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A carriage for allowing a fiber optic cable to be inserted into or removed from a carriage while preventing a fiber optic component being inserted into or removed from the carriage comprising:
   a carriage body member that includes an opening and a slot;
   wherein the opening of the carriage body is located at a front end of the carriage body;
   wherein the slot is configured to be associated with the opening;
   wherein the opening is sized and configured to receive the fiber optic component;
   wherein the carriage body includes a tab;
   wherein the tab is configured to be associated with the slot;
   wherein the slot is sized and configured to allow the fiber optic cable to be inserted into or removed from the opening through the slot while the fiber optic component is prevented from being inserted into or removed from the opening and through the slot;
   wherein the opening comprises a plurality of openings;
   wherein the slot comprises a plurality of slots;
   wherein each of the plurality of slots is configured to be associated with a respective one of the plurality of openings;
   wherein the tab comprises a plurality of tabs;
   wherein each of the plurality of tabs is configured to be separated from one another by a respective one of the plurality of slots; and
   wherein each of the plurality of slots is sized and configured to allow a fiber optic cable to be inserted or removed from a respective one of the plurality of openings and through a respective one of the plurality of slots while the fiber optic component is prevented from being inserted or removed from a respective one of the plurality of openings and through a respective one of the plurality of slots.

2. The carriage of claim 1, wherein the carriage body member includes a back wall, a top wall, and a plurality of side walls configured to extend from the back wall to the top wall; and
   wherein the top wall, the plurality of side walls and the back wall are configured to define the plurality of openings.

3. The carriage of claim 2, wherein the top wall is configured to include the plurality of tabs.

4. The carriage of claim 1, wherein the plurality of openings are sized and configured to receive a fiber optic splitter or a fiber optic adapter.

5. The carriage of claim 1, wherein the carriage body includes a cavity;
wherein a plurality of fiber management features are disposed in the cavity; and
wherein the plurality of fiber management features are configured to route the fiber optic cable to and from the front end of the carriage body.

6. A carriage for engaging a fiber optic cable while being disengaged from a fiber optic component comprising:
a body portion that includes a first engaging portion and a second engaging portion;
wherein the first engaging portion is configured to engage the fiber optic component;
wherein the second engaging portion is configured to allow the fiber optic cable to be inserted into the first engaging portion through the second engaging portion while the fiber optic component is prevented from being inserted into the first engaging portion and through the second engaging portion; and
wherein the first engaging portion comprises a plurality of first engaging portions, the second engaging portion comprises a plurality of second engaging portions, and each of the plurality of second engaging portions is configured to be associated with a respective one of the plurality of first engaging portions.

7. The carriage of claim 6, wherein the first engaging portion comprises an opening portion.

8. The carriage of claim 6, wherein the second engaging portion comprises a slot portion.

9. The carriage of claim 6, wherein the body portion includes a tab portion.

10. The carriage of claim 6, wherein the first engaging portion is located at a front end of the body portion.

11. The carriage of claim 6, wherein the second engaging portion is configured to be associated with the first engaging portion.

12. The carriage of claim 6, wherein the first engaging portion is sized to fit the fiber optic component.

13. The carriage of claim 6, wherein the second engaging portion comprises a slot portion, and the body portion includes a tab portion that is configured to be associated with the slot portion.

14. The carriage of claim 6, wherein the second engaging portion is sized to allow the fiber optic cable to be removed from the first engagement portion through the second engaging portion while the fiber optic component is prevented from being removed from the first engagement portion and through the second engagement portion.

15. The carriage of claim 6, wherein the body portion includes a plurality of tab portions.

16. The carriage of claim 15, wherein the second engaging portion comprises a plurality of second engaging portions, and each of the plurality of tabs portions is configured to be separated from one another by a respective one of the plurality of second engaging portions.

17. The carriage of claim 6, wherein the second engaging portion comprises a plurality of second engaging portions;
wherein the first engaging portion comprises a plurality of first engaging portions; and
wherein each of the plurality of second engaging portions is sized and configured to allow a fiber optic cable to be inserted or removed from a respective one of the plurality of first engaging portions and through a respective one of the plurality of second engaging portions while the fiber optic component is prevented from being inserted or removed from a respective one of the plurality of first engaging portion and through a respective one of the plurality of second engaging portions.

18. The carriage of claim 17, wherein the plurality of first engaging portions comprises a plurality of opening portions and the plurality of second engaging portions comprises a plurality of slot portions.

19. The carriage of claim 6, wherein the body portion includes a back wall, a top wall, and a plurality of side walls configured to extend from the back wall to the top wall; and
wherein the top wall, the side walls and the back wall are configured to define the first engaging portion.

20. The carriage of claim 9, wherein the body portion includes a back wall, a top wall, and a plurality of side walls configured to extend from the back wall to the top wall;
wherein the top wall, the plurality of side walls and the back wall are configured to define the first engaging portion; and
wherein the top wall is configured to include the tab portion.

21. The carriage of claim 6, wherein the first engagement portion is sized and configured to receive a fiber optic splitter or a fiber optic adapter.

22. The carriage of claim 10, wherein the body portion includes a cavity;
wherein a plurality of fiber management features are disposed in the cavity; and
wherein the plurality of fiber management features are configured to route the fiber optic cable to and from the front end of the body portion.

23. A carriage for engaging a fiber optic cable while being disengaged from a fiber optic component comprising:
a body portion that includes a first engaging portion and a second engaging portion;
wherein the first engaging portion is configured to engage the fiber optic component;
wherein the second engaging portion is configured to allow the fiber optic cable to be inserted into the first engaging portion through the second engaging portion while the fiber optic component is prevented from being inserted into the first engaging portion and through the second engaging portion;
wherein the body portion includes a back wall, a top wall, and a plurality of side walls configured to extend from the back wall to the top wall; and
wherein the top wall, the side walls, and the back wall are configured to define the first engaging portion.

24. The carriage of claim 23, wherein the first engaging portion comprises an opening portion.

25. The carriage of claim 23, wherein the second engaging portion comprises a slot portion.

26. The carriage of claim 23, wherein the body portion includes a tab portion.

27. The carriage of claim 23, wherein the first engaging portion is located at a front end of the body portion.

28. The carriage of claim 23, wherein the second engaging portion is configured to be associated with the first engaging portion.

29. The carriage of claim 23, wherein the first engaging portion is sized to fit the fiber optic component.

30. The carriage of claim 23, wherein the second engaging portion comprises a slot portion, and the body portion includes a tab portion that is configured to be associated with the slot portion.

31. The carriage of claim 23, wherein the second engaging portion is sized to allow the fiber optic cable to be removed from the first engagement portion through the second engaging portion while the fiber optic component is prevented from being removed from the first engagement portion and through the second engagement portion.

32. The carriage of claim 23, wherein the body portion includes a plurality of tab portions.

33. The carriage of claim 32, wherein the second engaging portion comprises a plurality of second engaging portions, and each of the plurality of tabs portions is configured to be separated from one another by a respective one of the plurality of second engaging portions.

34. The carriage of claim 23, wherein the second engaging portion comprises a plurality of second engaging portions;
   wherein the first engaging portion comprises a plurality of first engaging portions; and
   wherein each of the plurality of second engaging portions is sized and configured to allow a fiber optic cable to be inserted or removed from a respective one of the plurality of first engaging portions and through a respective one of the plurality of second engaging portions while the fiber optic component is prevented from being inserted or removed from a respective one of the plurality of first engaging portion and through a respective one of the plurality of second engaging portions.

35. The carriage of claim 34, wherein the plurality of first engaging portions comprises a plurality of opening portions and the plurality of second engaging portions comprises a plurality of slot portions.

36. The carriage of claim 26, wherein the top wall is configured to include the tab portion.

37. The carriage of claim 23, wherein the first engagement portion is sized and configured to receive a fiber optic splitter or a fiber optic adapter.

38. The carriage of claim 27, wherein the body portion includes a cavity;
   wherein a plurality of fiber management features are disposed in the cavity; and
   wherein the plurality of fiber management features are configured to route the fiber optic cable to and from the front end of the body portion.

39. A carriage for engaging a fiber optic cable while being disengaged from a fiber optic component comprising:
   a body portion that includes a first engaging portion and a second engaging portion;
   wherein the first engaging portion is configured to engage the fiber optic component;
   wherein the second engaging portion is configured to allow the fiber optic cable to be inserted into the first engaging portion through the second engaging portion while the fiber optic component is prevented from being inserted into the first engaging portion and through the second engaging portion;
   wherein the first engaging portion is located at a front end of the body portion;
   wherein the body portion includes a cavity;
   wherein a plurality of fiber management features are disposed in the cavity; and
   wherein the plurality of fiber management features are configured to route the fiber optic cable to and from the front end of the body portion.

40. The carriage of claim 39, wherein the first engaging portion comprises an opening portion.

41. The carriage of claim 39, wherein the second engaging portion comprises a slot portion.

42. The carriage of claim 39, wherein the body portion includes a tab portion.

43. The carriage of claim 39, wherein the second engaging portion is configured to be associated with the first engaging portion.

44. The carriage of claim 39, wherein the first engaging portion is sized to fit the fiber optic component.

45. The carriage of claim 39, wherein the second engaging portion comprises a slot portion, and the body portion includes a tab portion that is configured to be associated with the slot portion.

46. The carriage of claim 39, wherein the second engaging portion is sized to allow the fiber optic cable to be removed from the first engagement portion through the second engaging portion while the fiber optic component is prevented from being removed from the first engagement portion and through the second engagement portion.

47. The carriage of claim 39, wherein the body portion includes a plurality of tab portions.

48. The carriage of claim 47, wherein the second engaging portion comprises a plurality of second engaging portions, and each of the plurality of tabs portions is configured to be separated from one another by a respective one of the plurality of second engaging portions.

49. The carriage of claim 39, wherein the second engaging portion comprises a plurality of second engaging portions;
   wherein the first engaging portion comprises a plurality of first engaging portions; and
   wherein each of the plurality of second engaging portions is sized and configured to allow a fiber optic cable to be inserted or removed from a respective one of the plurality of first engaging portions and through a respective one of the plurality of second engaging portions while the fiber optic component is prevented from being inserted or removed from a respective one of the plurality of first engaging portion and through a respective one of the plurality of second engaging portions.

50. The carriage of claim 49, wherein the plurality of first engaging portions comprises a plurality of opening portions and the plurality of second engaging portions comprises a plurality of slot portions.

51. The carriage of claim 42, wherein the body portion includes a back wall, a top wall, and a plurality of side walls configured to extend from the back wall to the top wall;
   wherein the top wall, the plurality of side walls and the back wall are configured to define the first engaging portion; and
   wherein the top wall is configured to include the tab portion.

52. The carriage of claim 39, wherein the first engagement portion is sized and configured to receive a fiber optic splitter or a fiber optic adapter.

* * * * *